US009481476B2

(12) United States Patent
Hwang et al.

(10) Patent No.: US 9,481,476 B2
(45) Date of Patent: Nov. 1, 2016

(54) SPACE OBJECT DISPOSAL DEVICE AND SPACE OBJECT DISPOSAL METHOD

(71) Applicant: ELECTRONICS AND TELECOMMUNICATIONS RESEARCH INSTITUTE, Daejeon (KR)

(72) Inventors: Yoo La Hwang, Daejeon (KR); Byoung Sun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/617,129

(22) Filed: Feb. 9, 2015

(65) Prior Publication Data

US 2015/0251777 A1 Sep. 10, 2015

(30) Foreign Application Priority Data

Mar. 7, 2014 (KR) ........................ 10-2014-0027007

(51) Int. Cl.
*B64G 1/24* (2006.01)

(52) U.S. Cl.
CPC .................................... *B64G 1/242* (2013.01)

(58) Field of Classification Search
CPC ................................ B46G 1/242; B46G 1/10
USPC ........................................................... 701/13
See application file for complete search history.

(56) References Cited

U.S. PATENT DOCUMENTS

| | | | | |
|---|---|---|---|---|
| 4,580,747 | A | 4/1986 | Pearson | |
| 6,419,191 | B1 * | 7/2002 | Hoyt | B64G 1/10 244/158.2 |
| 6,921,051 | B2 | 7/2005 | Lopata et al. | |
| 2006/0241824 | A1 * | 10/2006 | Kawaguchi | B64G 1/007 701/13 |

* cited by examiner

*Primary Examiner* — McDieunel Marc
*Assistant Examiner* — James E Stroud
(74) *Attorney, Agent, or Firm* — Ladas & Parry LLP

(57) ABSTRACT

Disclosed are a space object disposal device and a space object disposal method using a rotation motion. The device for disposing a space object includes: a disposal orbit calculation unit configured to calculate a disposal orbit of a space object; an escape velocity calculation unit configured to calculate an escape velocity at which the space object moves along the disposal orbit; and a rotation driving unit configured to be connected the space object, rotate the space object on a predetermined rotation orbit so as to reach the escape velocity, and separate the space object at a point of contact of the predetermined rotation orbit and the disposal orbit when the space object rotates at the escape velocity.

19 Claims, 3 Drawing Sheets

SPACE OBJECT DISPOSAL DEVICE AND SPACE OBJECT DISPOSAL METHOD

CROSS-REFERENCE TO RELATED APPLICATIONS

This application claims priority to and the benefit of Korean Patent Application No. 10-2014-0027007 filed in the Korean Intellectual Property Office on Mar. 7, 2014, the entire contents of which are incorporated herein by reference.

TECHNICAL FIELD

The present invention relates to a space object disposal device and a space object disposal method, and more particularly, to a space object disposal device and a space object disposal method, which uses a rotational motion.

BACKGROUND ART

Currently, the number of satellites launched by human is about 6,000. Among them, about 3,500 satellites are normally operating. Low earth orbit satellites present at 1500 km or lower from the earth among the satellites having expired lifespans lower their altitudes to enter the atmosphere. Most of the small satellites among the low earth orbit satellites are combusted in the atmosphere and disappear.

However, in contrast to the low earth orbit satellite, when lifespan of geostationary orbit satellite positioned at about 35,786 km from the earth is expired, the geostationary orbit satellite moves up from its position by 300 km by using last of its residual fuel in order to prevent collision with a newly lunched satellite or other satellites. Accordingly, the geostationary orbit satellite whose lifespan is over cannot be positioned on the geostationary orbit any more. As described above, an orbit higher than the geostationary orbit by about 300 km is called a graveyard orbit, and is also called a supersynchronous orbit or a junk orbit.

SUMMARY OF THE INVENTION

The present invention has been made in an effort to provide a space object disposal device and a space object disposal method, which make a satellite with an expired lifespan deviate from an orbit of the earth's atmosphere by using centrifugal force by a circular motion and release the satellite to outer space.

An exemplary embodiment of the present invention provides a device for disposing a space object, including: a disposal orbit calculation unit configured to calculate a disposal orbit of a space object; an escape velocity calculation unit configured to calculate an escape velocity at which the space object moves along the disposal orbit; and a rotation driving unit configured to connect the space object, rotate the space object in a predetermined rotation orbit so as to reach the escape velocity, and separate the space object at a point of contact of the predetermined rotation orbit and the disposal orbit when the space object rotates at the escape velocity.

The space object and the rotation driving unit may be connected by a cable.

The cable may be a space tether.

The disposal orbit calculation unit may calculate the disposal orbit based on a probability of collision between the space object and another object.

The disposal orbit may have a shape of hyperbola or a parabola.

The space object may be a geostationary orbit satellite.

According to the space object disposal device and the space object disposal method according to the present invention, it is possible to release a satellite, of which a duty is ended or lifespan is expired, far away into the space to the outside of the gravity field of the earth. Accordingly, it is possible to reduce a risk that a satellite, a space structure, a spacecraft, which are currently operated in the orbit around the earth, collide with or are destroyed by the satellite of which lifespan is expired. Further, it is possible to prevent overcrowding of the graveyard orbit due to a method of moving the satellite, of which lifespan is expired, to the graveyard orbit and neglecting the satellite.

DETAILED DESCRIPTION

Figure 1:
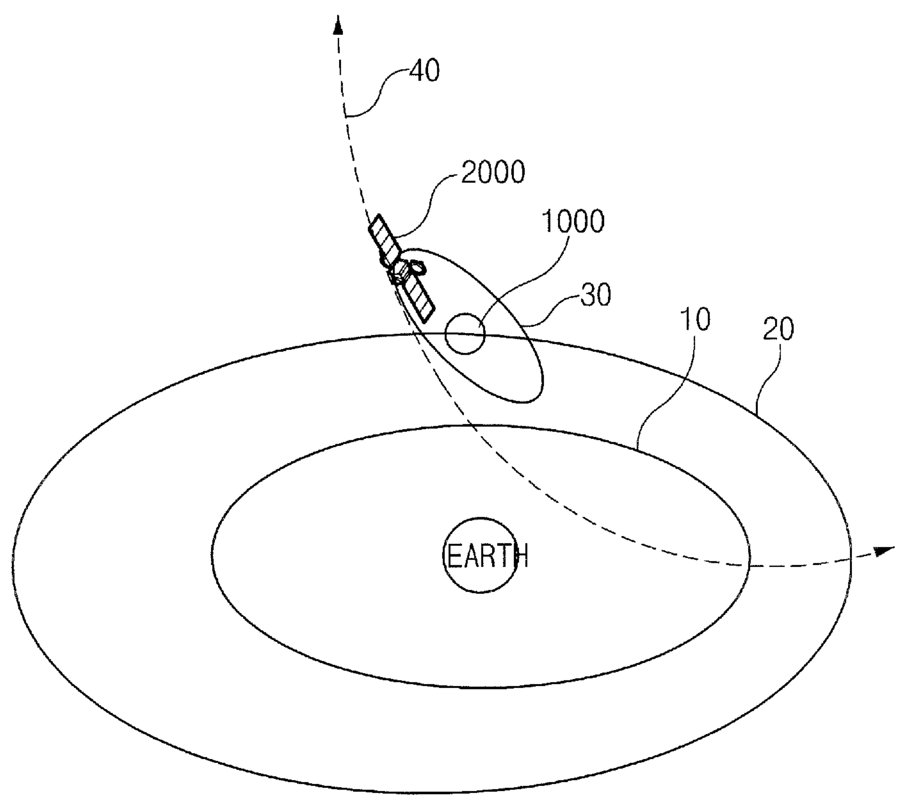
FIG. 1 is a schematic diagram illustrating a space object disposal device and a space object.

Hereinafter, an exemplary embodiment of the present invention will be described in detail with reference to the accompanying drawings, but the present invention is not restricted or limited by the exemplary embodiment. For reference, in the description, the same reference numeral substantially denotes the same element, and under this rule, contents described in other drawings may be referred for description. Further, contents determined to be apparent to those skilled in the art or repeated will be omitted.

FIG. 1 is a schematic diagram illustrating a space object disposal device and a space object.

Referring to FIG. 1, reference numeral 10 denotes a geostationary orbit, reference numeral 20 denotes a graveyard orbit, reference numeral 30 denotes a space object rotation orbit, reference numeral 40 denotes a disposal orbit, reference numeral 1000 denotes a space object disposal device, and reference numeral 2000 denotes a space object.

The geostationary orbit 10 is an orbit positioned at about 35,786 km from the earth. A geostationary orbit satellite on the geostationary orbit 10 performs its duty according to an assigned rule. The graveyard orbit 20 is an orbit positioned higher than the geostationary orbit 10 by a radius of about 300 km on an opposite side of the earth, and a satellite whose lifespan has been over is disposed in the graveyard orbit 20. The space object rotation orbit 30 is an orbit in which the space object disposal device 1000 rotates the space object 2000. The space object 2000 is repeatedly accelerated and rotated by driving force of the space object disposal device 1000, so that a rotation speed of the space object 2000 is increased. The disposal orbit 40 is an orbit in which the space object 2000 moves according to an escape velocity, and the space object 2000 moves along the disposal orbit 40 and flies away into the space where the gravity field of the earth cannot influence on it.

Hereinafter, the space object disposal device 1000 and the space object disposal method according to the present invention will be described in detail as exemplary embodiments.

Figure 2:
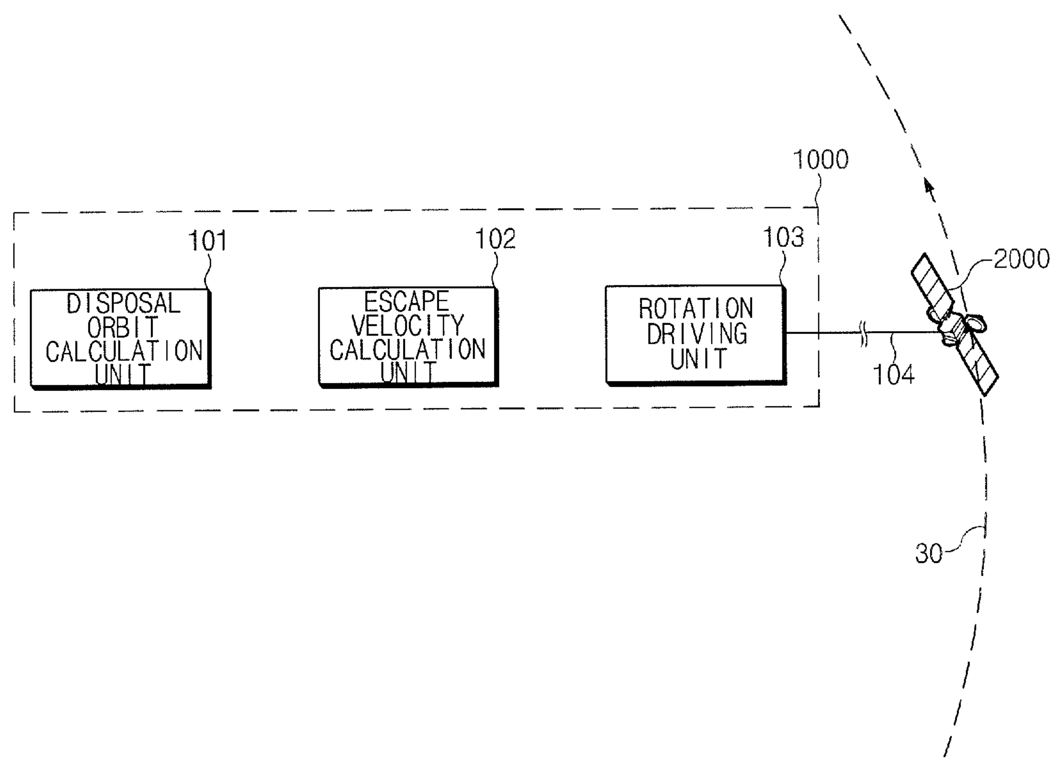
FIG. 2 is a schematic diagram illustrating a space object disposal device according to an exemplary embodiment of the present invention.

FIG. 2 is a schematic diagram illustrating the space object disposal device 1000 according to the exemplary embodiment of the present invention.

Referring to FIG. 2, the space object disposal device 1000 according to the exemplary embodiment of the present invention includes a disposal orbit calculation unit 101, an escape velocity calculation unit 102, and a rotation driving unit 103. A connection member 104 connects the rotation driving unit 103 and the space object 2000. Although not illustrated, the space object disposal device 1000 may further include a launching unit for moving in the space, a controller for controlling each element, a communication unit for communicating with a control station on the earth, and the like. Further, since the space object disposal device 1000 may further include the launching unit for moving in the space, the space object disposal device 1000 may freely move to the geostationary orbit 10, the graveyard orbit 20, and the like. However, the space object disposal device 1000 is generally positioned on the graveyard orbit to perform the space object disposal method.

The disposal orbit calculation unit 101 calculates an orbit to be moved after the space object 2000 reaches an escape velocity by driving force obtained from the space object disposal device 1000 and is separated from the space object disposal device 1000. The disposal orbit calculation unit 101 needs to prevent the space object 2000 from periodically moving in a circular or ellipsoidal shape in response to the gravity field of the earth when calculating the disposal orbit 40. The reason is that when the space object 2000 periodically moves in a circular or ellipsoidal shape which centered on the earth, the space object 2000 may collide with other satellites, an asteroid, and space debris. Accordingly, the disposal orbit 40 may have a shape of a hyperbola or a parabola without forming a closed curve.

In the meantime, the disposal orbit calculation unit 101 may consider a probability of collision with an object floating in space when calculating the disposal orbit 40. The probability of collision may be obtained by using information from the control station on the earth.

More particularly, developed countries in the space field have developed a space debris collision risk analysis system in order to protect their satellites from a collision risk with a space object since 1990's. Representative collision risk probability calculation systems include the Orbital Debris Engineering Model (ORDEM) by the National Aeronautics and Space Administration (NASA) from the US, the Meteoroid and Space Debris Terrestrial Environment Reference (MASTER) by the European Space Agency (ESA) from Europe. Further, the Collision Risk Assessment Software (CRASS) by the Centre National d'Etudes Spatiales (CNES) of France has a function of predicting and managing a mutual collision risk between French satellites and space debris by using Two-Line Elements (TLE) by the North American Aerospace Defense Command (NORAD) from the US. That is, the disposal orbit calculation unit 101 may obtain information on the probability of collision from the control station on the earth including the aforementioned system and calculate the disposal orbit 40.

The escape velocity calculation unit 102 calculates an escape velocity at which the space object 2000 overcomes the gravity field of the earth and moves along the disposal orbit 40. For example, the escape velocity of the space object 2000 may be calculated by $$v_e = \sqrt{\frac{2GM}{r}}$$

based on the law of the conservation of energy. In this case, G means a gravity constant of a planet (the earth) from which the space object escapes, M means mass of a planet (the earth) from which the space object escapes, and r means an altitude at which the escaping space object 2000 is positioned. In this case, for the earth that is the planet from which the space object escapes, a value of G×M is about 398600.4418 $km^3/s^2$, a radius of the earth is 6,378 km, and an altitude of the graveyard orbit is 36,086 km, so that r=6378+36086=42464 km. According to the aforementioned equation, the escape velocity on the graveyard orbit 20 may be calculated. However, the escape velocity needs to be calculated based on the space object 2000 which will be actually disposed, and an accurate altitude of the space object disposal device 1000.

The escape velocity calculation unit 102 calculates an angular speed demanded for the escape based on the calculated escape velocity and a length of the connection member 104, and then transmits information on the angular speed about the calculated escape velocity and the like to the rotation driving unit 103. In the meantime, the escape velocity is determined by an altitude of an orbit in which the space object 2000 is disposed, and the escape velocity at the vicinity of the geostationary orbit 10 is about 4.3 km/s according to the calculation based on the equation. For example, when it is assumed that the escape velocity is about 4.3 km/s and the length of the connection member 104 is 150 m, the angular speed is 28.67 rad/s (=273.88 rpm).

In the meantime, the disposal orbit calculation unit 101 and the escape velocity calculation unit 102 may also be implemented by a device, such as a microcomputer, capable of performing the calculation.

The rotation driving unit 103 applies (angular) acceleration to the space object 2000 connected by the connection member 104 and centrifugally rotates the space object 2000 according to the space object rotation orbit 30 based on the rotation driving unit 103. Accordingly, a rotation speed of the space object 2000 is increased while the space object 2000 is centrifugally rotated. When the rotation speed of the space object 2000 reaches the escape velocity calculated by the escape velocity calculation unit 102, and the space object 2000 is positioned at a predetermined position on the disposal orbit 40 along which the space object 2000 may move, the rotation driving unit 103 separates the connection member 104 connected with the space object 2000. The separated connection member 104 and the space object 2000 connected with the connection member 104 move in a tangential direction of the space object rotation orbit 30, that is, the disposal orbit 40, at the calculated escape velocity, and is released far away from the earth's atmosphere to outer space.

The connection member 104 is a member connecting the space object 2000 and the space object disposal device 1000 (or the rotation driving unit 103). The connection member 104 may be formed of a steel beam, which is a rigid body, or a cable. For example, the connection member 104 may be a space tether.

The space tether is a long cable with high intensity formed of carbon fiber, Kevlar™ fiber, a copper wire as a conductor, and the like. The space tether may be called an electrodynamic tether or a momentum exchange tether depending on a performed function. The space tether may be close to a rigid body according to an included material. The space tether as the connection member 104 of the present invention may be used for control of a posture of the space object disposal device 1000 and orbital maneuvering, or generate a thrust when the space object disposal is not performed. That is, when the space tether is used as the connection member 104, the space tether may be utilized for multi-purposes without being limited to the space object disposal. In the meantime, the space tether may not only be included in the space object disposal device 1000 but also be included in the space object 2000.

The space object 2000 is an object which is a disposal target of the space object disposal device 1000 and floats in the space, and may be called space debris. However, in the present specification, the space object 2000 is described as a geostationary orbit satellite of which a duty is ended or lifespan is expired. When the duty of the geostationary orbit satellite is ended or lifespan of the geostationary orbit satellite is terminated, the geostationary orbit satellite may move to the vicinity of the space object disposal device 1000 positioned in the graveyard orbit 200 by using the residual fuel. In the meantime, when the geostationary orbit satellite has no residual fuel or cannot move to the vicinity of the space object disposal device 1000, the space object disposal device 1000 may access to the vicinity of the geostationary orbit satellite and perform the space object disposal method which will be described below.

The configuration of the space object disposal device 1000 according to the exemplary embodiment of the present invention has been described above. Hereinafter, the space object disposal method according to an exemplary embodiment of the present invention will be described.

Figure 3:
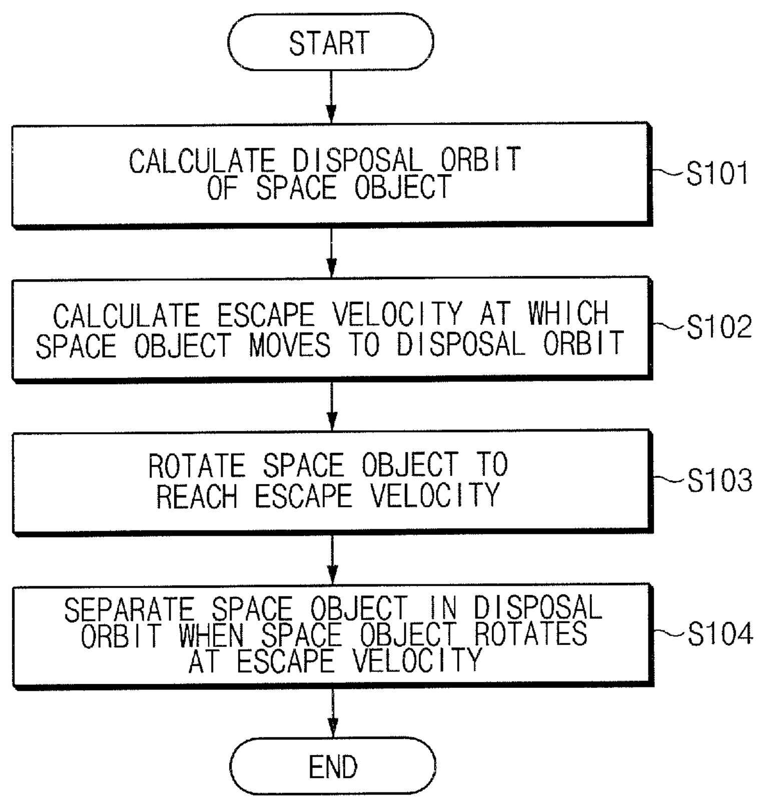
FIG. 3 is a flowchart illustrating a space object disposal method according to an exemplary embodiment of the present invention.

FIG. 3 is a flowchart illustrating the space object disposal method according to an exemplary embodiment of the present invention.

Referring to FIG. 3, the space object disposal method according to an exemplary embodiment of the present invention includes operation S101 of calculating the disposal orbit 40 of the space object 2000, operation S102 of calculating an escape velocity at which the space object 2000 moves along the disposal orbit 40, operation S103 of rotating the connected space object 2000 to reach the escape velocity; and operation S104 of separating the space object 2000 from the disposal orbit 40 when the space object 2000 rotates at the escape velocity.

In operation S101, the disposal orbit calculation unit 101 of the space object disposal device 1000 calculates the disposal orbit 40 of the space object 2000.

As described above, the disposal orbit calculation unit 101 needs to prevent the space object 2000 from periodically moving in a circular or ellipsoidal shape by the gravity field of the earth when calculating the disposal orbit 40. The disposal orbit 40 may have a shape of, for example, a hyperbola or a parabola without forming a closed curve.

In the meantime, operation S101 of calculating the disposal orbit 40 of the space object 2000 may include an operation of calculating the disposal orbit 40 of the space object 2000 by considering a probability of collision with an object floating in the space. The probability of collision may be obtained by using information from the control station on the earth. The control station may include the collision risk probability calculation system of the ORDEM by NASA from the US, MASTER by the ESA from Europe.

In operation S102, the escape velocity calculation unit 102 calculates the escape velocity at which the space object 2000 overcomes the gravity field of the earth and moves along the disposal orbit 40. The escape velocity calculation unit 102 may transmit information on an angular speed about the calculated escape velocity and the like to the driving unit 103. In the meantime, when the space object 2000 is the geostationary orbit satellite as described above, the escape velocity at the vicinity of the geostationary orbit 10 may be about 4.3 km/s.

In operation S103, the rotation driving unit 103 applies (angular) acceleration to the space object 2000 connected through the connection member 104 and centrifugally rotates the space object 2000 according to the space object rotation orbit 30 based on the rotation driving unit 103. Accordingly, a rotation speed of the space object 2000 is increased while the space object 2000 is centrifugally rotated. When the speed of the space object 2000 reaches the escape velocity calculated in operation S102, the space object 2000 is not accelerated any longer and maintains the escape velocity.

In operation S104, when the speed of the space object 2000 reaches the escape velocity calculated in operation S102, and the space object 2000 is positioned at a point of contact of the space object rotation orbit 30, in which the space object 2000 may move along the disposal orbit 40, and the disposal orbit 40, the rotation driving unit 103 separates the space object 2000 from the space object disposal device 1000 (or the rotation driving unit 103). The separated space object 2000 moves in a tangential direction of the space object rotation orbit 30, that is, the disposal orbit 40, at the calculated escape velocity, and is released far away from the earth to outer space.

In the meantime, the space object disposal device 1000 (or the rotation driving unit 103) and the space object 2000 may be connected by using the connection member 104. The connection member 104 may be formed of a steel beam, which is a rigid body, or a cable. For example, the connection member 104 may be the aforementioned space tether.

According to the space object disposal device 1000 and the space object disposal method according to the exemplary embodiment of the present invention, it is not necessary to station the satellite, of which a duty is ended or a lifespan is expired, on the orbit within the gravity field of the earth. Accordingly, it is possible to reduce a risk that currently operated satellite, space structure, spacecraft collide with or are destroyed by space debris. Further, it is possible to prevent overcrowding of the graveyard orbit due to a method of moving the satellite, of which a lifespan is expired, to the graveyard orbit and neglecting the satellite.

The space tether is used as the connection member 104 of the present invention, so that it is possible to control a posture of the space object disposal device 1000 (or the space object 2000), adjust the orbit, and the like when the space object disposal is not performed. The space tether may be utilized for multi-purposes as well as for the connection member 104.

The disposal orbit calculation unit 101 considers a probability of collision with another object when calculating the disposal orbit 40, so that it is possible to more safely dispose the space object. The disposal orbit 40 has the shape of a hyperbola or a parabola, so that it is possible to prevent the space object 2000 from moving back to the same space again.

As described above, the present invention has been described with reference to the exemplary embodiment of the present invention, but those skilled in the art will understand that the present invention may be variously modified and changed within the scope without departing from the spirit and the area of the present invention defined in the claims. Accordingly, the spirit of the present invention should be recognized by the claims described below, and all of the equal or equivalent changes thereof shall belong to the scope of the spirit of the present invention.

What is claimed is:

1. A device for disposing a space object, comprising:

a disposal orbit calculation unit configured to calculate a disposal orbit of the space object;

an escape velocity calculation unit configured to calculate an escape velocity at which the space object moves along the disposal orbit; and a rotation driving unit configured to be connected the space object, rotate the space object on a predetermined rotation orbit so as to reach the escape velocity, and separate the space object at a point of contact of the predetermined rotation orbit and the disposal orbit when the space object rotates at the escape velocity, wherein the disposal orbit corresponds to an orbit on which the space object flies away at the escape velocity into the space against the earth.

2. The device of claim 1, wherein the space object and the rotation driving unit are connected by a cable.

3. The device of claim 2, wherein the cable is a space tether.

4. The device of claim 1, wherein the disposal orbit calculation unit calculates the disposal orbit based on a probability of collision between the space object and another object.

5. The device of claim 1, wherein the disposal orbit has a shape of hyperbola or a parabola.

6. The device of claim 1, wherein the space object is a geostationary orbit satellite.

7. A method of disposing a space object using a computing device, comprising:

calculating a disposal orbit of the space object;

calculating an escape velocity, wherein the space object moves along the disposal orbit at the escape velocity;

rotating the connected space object on a predetermined rotation orbit so as to reach the escape velocity, wherein the space object is connected by a cable; and separating the space object at a point of contact of the predetermined rotation orbit and the disposal orbit when the space object rotates at the escape velocity, wherein the disposal orbit corresponds to an orbit on which the space object lies away at the escape velocity into the space against the earth.

8. The method of claim 7, wherein the cable is a space tether.

9. The method of claim 7, wherein the calculating of the disposal orbit includes calculating the disposal orbit based on a probability of collision between the space object and another object.

10. The method of claim 7, wherein the disposal orbit has a shape of hyperbola or a parabola.

11. The method of claim 7, wherein the space object is a geostationary orbit satellite.

12. The device of claim 1, further comprising:

a launching unit configured to move in the space; and a communication unit configured to communicate with a control station on the earth.

13. The device of claim 1, wherein the device is positioned on a graveyard orbit.

14. The device of claim 13, the graveyard orbit is an orbit positioned higher than a geostationary orbit by a radius of 300 km on an opposite side of the earth.

15. The device of claim 3, wherein the space tether controls a posture and an orbital maneuvering of the device, and generate a thrust when the space object is not performed.

16. A device for disposing a space object, comprising:

a disposal orbit calculation unit configured to calculate a disposal orbit of the space object based on a probability of collision between the space object and another object, wherein the probability of collision is obtained by using information from a control station on the earth;

an escape velocity calculation unit configured to calculate an escape velocity, wherein the space object moves along the disposal orbit at the escape velocity; and a rotation driving unit configured to connect to the space object, rotate the space object on a predetermined rotation orbit so as to reach the escape velocity, and separate the space object at a point of contact of the predetermined rotation orbit and the disposal orbit when the space object rotates at the escape velocity, wherein the disposal orbit corresponds to an orbit on which the space object flies away at the escape velocity into the space against the earth.

17. The device of claim 16, wherein the disposal orbit calculation unit calculates the disposal orbit based on a probability of collision between the space object and another object.

18. The device of claim 16, wherein the disposal orbit has a shape of hyperbola or a parabola.

19. The device of claim 16, wherein the space object is a geostationary orbit satellite.

* * * * *